US010090505B2

United States Patent
Heo et al.

(10) Patent No.: US 10,090,505 B2
(45) Date of Patent: Oct. 2, 2018

(54) SECONDARY BATTERY

(71) Applicant: SAMSUNG SDI CO., LTD., Yongin-si, Gyeonggi-do (KR)

(72) Inventors: Nari Heo, Yongin-si (KR); Minho Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 14/166,726

(22) Filed: Jan. 28, 2014

(65) Prior Publication Data

US 2015/0093634 A1    Apr. 2, 2015

(30) Foreign Application Priority Data

Oct. 1, 2013    (KR) .................... 10-2013-0117518

(51) Int. Cl.
*H01M 2/30*    (2006.01)
*H01M 2/06*    (2006.01)

(52) U.S. Cl.
CPC .............. *H01M 2/30* (2013.01); *H01M 2/06* (2013.01); *H01M 2200/00* (2013.01)

(58) Field of Classification Search
CPC ............ H01M 2/02; H01M 2/04; H01M 2/06; H01M 2/08; H01M 2/10; H01M 2/20; H01M 2/22; H01M 2/234; H01M 2/342; H01M 2/345; H01M 2/347; H01M 2/0146; H01M 2/0404; H01M 2/0473;
(Continued)

(56) References Cited

U.S. PATENT DOCUMENTS 8,216,705 B2 * 7/2012 Cho et al. .................. 429/7
2004/0126650 A1 * 7/2004 Kim .................... H01M 2/0426
429/61
2006/0051667 A1    3/2006 Kim
(Continued)

FOREIGN PATENT DOCUMENTS

JP    2009-259651    * 11/2009 ............ H01M 2/30
KR    10-2006-0011315    2/2006
(Continued)

OTHER PUBLICATIONS

Machine English Translatino of JP 2009-259651 to Matsumoto et al.*

*Primary Examiner* — Michael L Dignan
(74) *Attorney, Agent, or Firm* — Lewis Roca Rothgerber Christie LLP (57) ABSTRACT

A secondary battery includes an electrode assembly including a positive electrode plate and a negative electrode plate; a can accommodating the electrode assembly; and a cap assembly having a cap plate sealing the opening of the can, a terminal plate on one side of the cap plate and being electrically connected to the negative electrode plate, and an insulation plate located between the cap plate and the terminal plate, the insulation plate including a bottom plate, and first and second long side walls and first and second short side walls extending from the bottom plate and respectively encompassing opposing long sides and opposing short sides of the terminal plate, wherein the first and second long side walls have recessed regions, and wherein the terminal plate is configured to contact the can at the recessed regions when the can is deformed by compression.

7 Claims, 4 Drawing Sheets

(58) Field of Classification Search
CPC .... H01M 2200/00; H01M 4/04; H01M 4/425;
H01M 4/0146; H01M 2/30
USPC ........................................ 429/161, 171, 184
See application file for complete search history.

(56) References Cited

U.S. PATENT DOCUMENTS

| | | | |
|---|---|---|---|
| 2006/0093907 A1* | 5/2006 | Jeon et al. | 429/180 |
| 2006/0263684 A1* | 11/2006 | Song | 429/180 |
| 2006/0269838 A1* | 11/2006 | Song et al. | 429/174 |
| 2009/0317665 A1 | 12/2009 | Maeng et al. | |
| 2010/0143789 A1 | 6/2010 | Kim | |

FOREIGN PATENT DOCUMENTS

| KR | 10-2009-0132926 | 12/2009 |
|---|---|---|
| KR | 10-2010-0064668 | 6/2010 |

\* cited by examiner

SECONDARY BATTERY

CROSS-REFERENCE TO RELATED APPLICATION

This application claims priority to and the benefit of Korean Patent Application No. 10-2013-0117518, filed on Oct. 1, 2013, the entire content of which is incorporated herein by reference.

BACKGROUND

1. Field

Aspects of the present invention relate to a secondary battery.

2. Description of the Related Art

Accidents, such as sparking or explosion that may occur in secondary batteries may foster a sense of insecurity in consumers and may lower reliability of the secondary battery. Further, many countries importing secondary batteries are tightening their regulations for safety tests.

In a safety test of a secondary battery, the secondary battery is subjected to an electrical test, such as a short circuit, abnormal charge, over-charge or forced discharge, and a stability test of a lithium ion battery against explosion or ignition in physically unstable conditions, such as vibration or impact.

In particular, in a longitudinal compression test among various safety tests of secondary batteries, stability due to deformation of the battery is tested by sharply compressing both sides of a battery can. When an electrode assembly of the battery is deformed during the longitudinal compression test, active materials of positive electrode plates are brought into direct contact with each other to cause an electrochemical reaction, resulting in an electric short. Accordingly, a probability of generating smoke and flames may increase, and there is a risk of explosion in the worst case.

In this regard, before an electrical short occurs due to contact between the active materials of the positive and negative electrode plates, a current discharge is caused to another battery element, thereby considerably reducing risks of ignition and explosion.

In general, the battery undergoes deformation when a can, and therefore other various battery elements, is compressed for the first time during the longitudinal compression test. Therefore, battery elements having different polarities are electrically short circuited to cause current drains, thereby considerably suppressing the risks of ignition and explosion of battery.

In order to easily distribute the force of an impact applied to the secondary battery during a drop weight impact test. In a conventional secondary battery, however, the size of the secondary battery is gradually diminished and a width of the can is gradually reduced so that battery elements having different polarities are often electrically short circuited during the drop weight impact test, thereby causing current drains.

SUMMARY

Aspects of the present invention provide a secondary battery, which can cause electrical short circuits to elements having different polarities due to deformation of a can by impacts applied during a longitudinal compression, thereby leading to current consumption.

Other aspects of the present invention provide a secondary battery, which can prevent an electric short from occurring in elements having different polarities due to temporary deformation of the can due to impacts during a drop weight impact test.

In accordance with one aspect of the present invention, there is provided a secondary battery including an electrode assembly including a positive electrode plate and a negative electrode plate, a can accommodating the electrode assembly and electrically connected to the positive electrode plate, and a cap assembly including a cap plate sealing a top-end opening of the can, a terminal plate disposed under the cap plate and electrically connected to the negative electrode plate and an insulation plate disposed between the cap plate and the terminal plate, wherein the insulation plate includes a bottom plate, first and second long side walls surrounding opposite long sides of the terminal plate from edges of the bottom plate, and first and second short side walls surrounding opposite short sides of the terminal plate from edges of the bottom plate, recessed regions are formed on the first and second long side walls, and the terminal plate makes contact with an inner surface of the can through the recessed regions when the can is deformed during longitudinal compression.

The recessed regions may be formed at regions of the first and second long side walls, where they make contact with the first and second short side walls.

The recessed regions may be positioned to be close to the center of the can.

Widths of the first and second short side walls may be greater than widths of the opposite short sides of the terminal plate.

A side surface of the can may include a long side portion and a short side portion narrower than the long side portion.

A width of the short side portion of the can may be in a range of 3 mm to 7 mm.

When the can is deformed due to longitudinal compression, the terminal plate may make contact with the long sides of the can.

The first and second long side walls and the first and second short side walls may be formed to be as at least high as the terminal plate.

A width of the short side of the terminal plate may be 35% to 55% of the width of the can.

As described above, the secondary battery according to the embodiment of the present invention may cause electrical short circuits to elements having different polarities due to deformation of a can by impacts applied during a longitudinal compression, thereby leading to current consumption.

In addition, in the secondary battery according to the embodiment of the present invention, electrical short circuits can be prevented from being caused to elements having different polarities due to deformation of the can during a drop weight impact test.

Additional aspects of the invention will be set forth in part in the description which follows and, in part, will be apparent from the description.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, an exemplary embodiment of the invention will be described in detail with reference to the accompanying drawings.

Features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the drawings, the thicknesses or sizes of electrode plates and tapes may be exaggerated for clarity. Like numbers refer to like elements throughout. As used herein, the term "and/or" includes any and all combinations of one or more of the associated listed items.

In addition, the terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
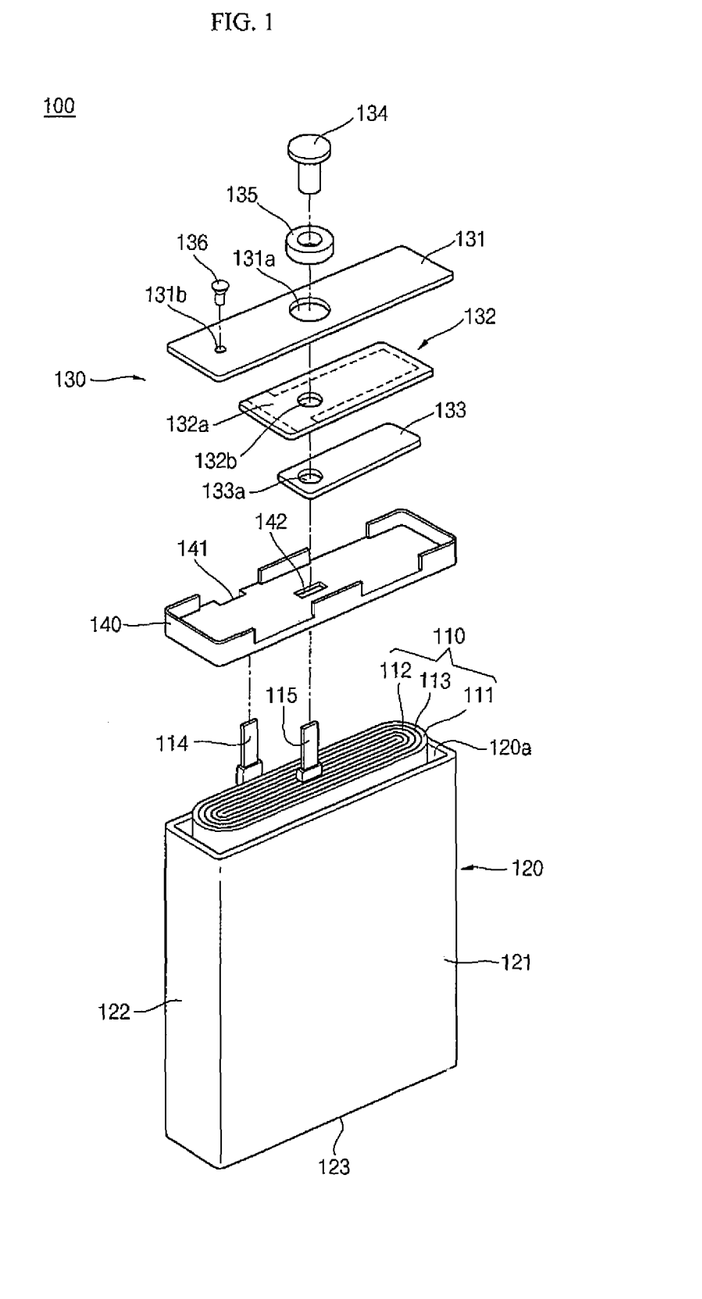
FIG. 1 is an exploded perspective view of a secondary battery according to an embodiment of the present invention.
Figure 2:
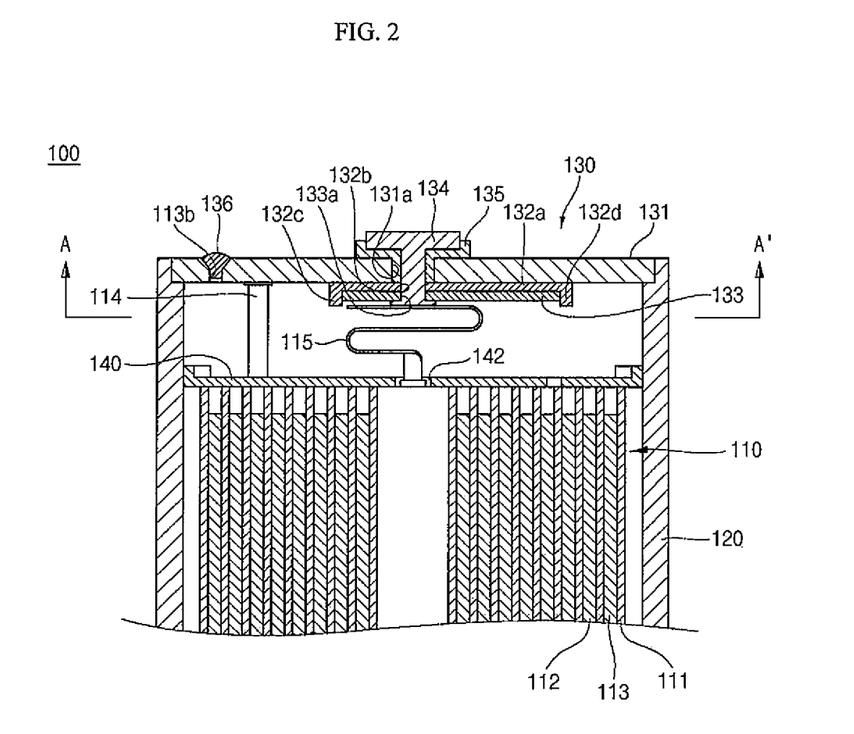
FIG. 2 is a partially longitudinal section view of FIG. 1.

FIG. 1 is an exploded perspective view of a secondary battery according to an embodiment of the present invention and FIG. 2 is a partially longitudinal section view of FIG. 1.

Referring to FIGS. 1 and 2, the secondary battery 100 according to the embodiment of the present invention includes an electrode assembly 110, a can 120, a cap assembly 130 and an insulation case 140.

The electrode assembly 110 includes a positive electrode plate 111, a negative electrode plate 112, and a separator 113 located between the positive electrode plate 111 and the negative electrode plate 112. The electrode assembly 110 is formed by winding the positive electrode plate 111, the negative electrode plate 112 and the separator 113 in a jelly roll configuration.

In one embodiment, the electrode assembly 110 may include the positive electrode plate 111 coated with a positive electrode active material, the negative electrode plate 112 coated with a negative electrode active material, and the separator 113 located between the positive electrode plate 111 and the negative electrode plate 112 to prevent a short while allowing only lithium ions to move. The positive electrode plate 111 may be formed of an aluminum (Al) foil, the negative electrode plate 112 may be formed of a copper (Cu) foil, and the separator 113 may be formed of polyethylene (PE) or polypropylene (PP), but the present invention is not limited to the materials of the positive and negative electrode plates 111 and 112 and the separator 113 listed herein. In addition, a positive electrode tab 114 is connected to the positive electrode plate 111 to protrude upward from a top portion of the electrode assembly 110, and a negative electrode tab 115 is connected to the negative electrode plate 112 to protrude upward from the top portion of the electrode assembly 110. The positive electrode tab 114 may be made of aluminum (Al)), the negative electrode tab 115 may be made of nickel (Ni), but the present invention is not limited to the materials of the positive and negative electrode tabs 114 and 115 listed herein.

The can 120 may have an approximately hexahedron shape provided with an opening 120a through which the electrode assembly 110 is accommodated. In detail, the can 120 includes a pair of long side portions 121 facing each other and having relatively large areas, a pair of short side portions 122 facing each other and having relatively small areas, and a bottom portion 123 vertically formed on bottom portions of the pair of long side portions 121 and the pair of short side portions 122.

In one embodiment, the can 120 is formed by a deep drawing method. Therefore, the pair of long side portions 121, the pair of short side portions 122, and the bottom portion 123 are integrally formed. In one embodiment, the can 120 is made of one of a steel, aluminum, or an equivalent thereof, but the present invention is not limited to the material of the can 120 listed herein.

In one embodiment, a width of the short side portion 122 of the can 120 is from approximately 3 mm to 7 mm. If the width of the can 120 is less than approximately 3 mm, it is difficult to accommodate the electrode assembly 110 into the can 120. If the width of the can 120 is greater than or equal to approximately 7 mm, a space between an inner surface of the can 120 and a terminal plate 133 can be relatively large. Thus, during a drop weight impact test of the secondary battery 100, the inner surface of the can 120 and the terminal plate 133 may not make contact with each other even with temporary deformation of the can 120. However, if the width of the can 120 is made to be smaller than or equal to approximately 7 mm for the purpose of forming the can 120 in a small size, there is a limit in spacing the inner surface of the can 120 and the terminal plate 133 from each other. In other words, during the drop weight impact test of the secondary battery 100, the inner surface of the can 120 and the terminal plate 133 are easily brought into contact with each other due to the temporary deformation of the can 120. However, the present invention is not limited to the width of the short side portion 122 of the can 120.

An electrolytic solution is accommodated in the can 120 together with the electrode assembly 110. The electrolytic solution may serve as a medium of moving lithium ions generated by an electrochemical reaction carried out in the positive and negative electrode plates 111 and 112 of the second battery 100 during charge and discharge operations. The electrolytic solution may be a nonaqueous organic electrolytic solution prepared by mixing a lithium salt and a high-purity organic solvent. In addition, the electrolytic solution may be a polymer using a polymeric electrolyte.

As used herein, the longitudinal compression applied to the secondary battery 100 refers to a state in which the short side portions 122 of the can 120 are compressed by an external force to cause deformation to the can 120.

The second battery 100 according to the embodiment of the present invention is configured to cause a discharge due to current drains by allowing the long side portions 121 of the can 120 to make contact with the terminal plate 133 of the cap assembly 130 temporarily deformed during the longitudinal compression, which will later be described.

In addition, the impact applied to the secondary battery 100 during the drop weight impact test refers to an impact applied to the secondary battery 100 colliding with the bottom after freefalling. The secondary battery 100 undergoes deformation due to the impact applied during the drop weight impact test, so that the long side portions 121 are temporarily bent. However, after the temporary deformation, the long side portions 121 are restored into their original forms. Therefore, the second battery 100 according to the embodiment of the present invention prevents the long side portions 121 from making contact with the terminal plate 133 of the cap assembly 130 temporarily deformed during the longitudinal compression, which will later be described.

The cap assembly 130 is coupled to a top portion of the can 120, thereby preventing the electrode assembly 110 from deviating to the outside and preventing the electrolytic solution from leaking.

The cap assembly 130 includes the cap plate 131, an insulation plate 132, and the terminal plate 133 sequentially connected to each other.

The cap plate 131 is formed of a metal plate sized and shaped to fit the top-end opening 120*a* of the can 120 and may be made of aluminum or an aluminum alloy. A terminal passing hole 131*a* is formed at the center of the cap plate 131, and an electrolyte injection hole 131*b* through which an electrolytic solution is injected is formed at one side of the cap plate 131. A negative electrode terminal 134 to be described later is inserted into the terminal passing hole 131*a*. In addition, in order to insulate the negative electrode terminal 134 and the cap plate 131 from each other, a tubular gasket 135 is located between the negative electrode terminal 134 and the cap plate 131. After the cap assembly 130 is assembled to the top-end opening 120*a* of the can 110, the electrolytic solution is injected through the electrolyte injection hole 131*b*, and the electrolyte injection hole 131*b* is then sealed by a plug 136.

Figure 3A:
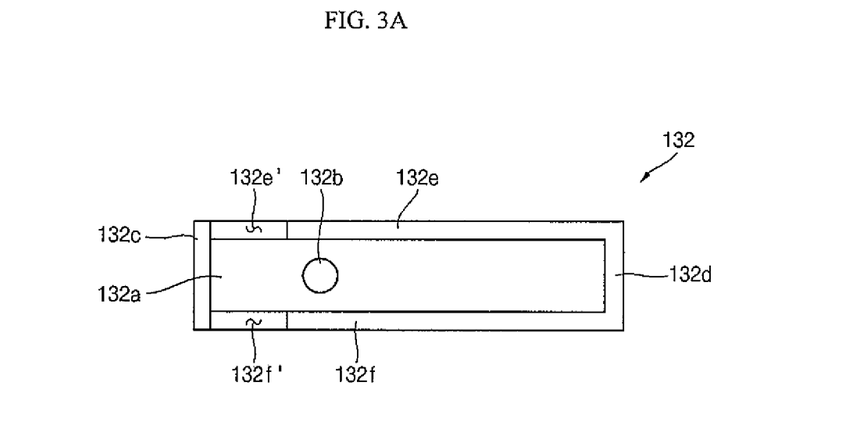
FIG. 3A is a bottom view of an insulation plate according to an embodiment of the present invention and FIG. 3B is a side view of the insulation plate shown in FIG. 3A.
Figure 3B:
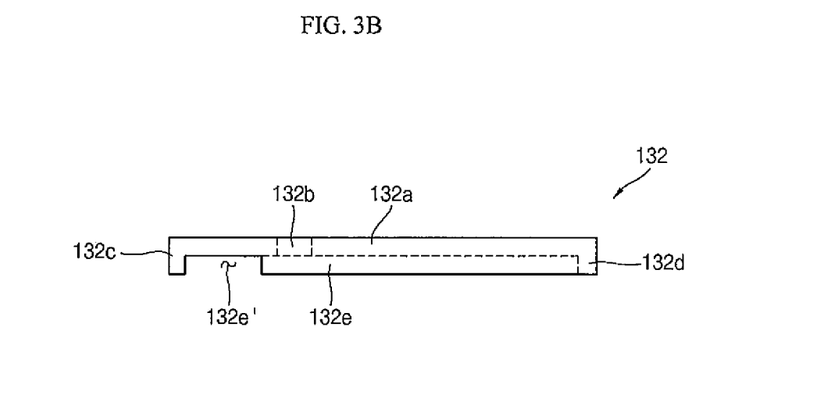

FIG. 3A is a bottom view of an insulation plate according to an embodiment of the present invention and FIG. 3B is a side view of the insulation plate shown in FIG. 3A.

First, the insulation plate 132 will now be described with reference to FIGS. 3A and 3B.

The insulation plate 132 is made of an insulating material, like the gasket 135, and is installed on a bottom surface of the cap plate 131. The insulation plate 132 includes a bottom plate 132*a* having the terminal passing hole 132*b* located at a portion corresponding to the terminal passing hole 131*a* of the cap plate 131, and sidewalls 132*c*, 132*d*, 132*e* and 132*f* downwardly extending from edges of the bottom plate 132*a*.

In one embodiment, the sidewalls 132*c*, 132*d*, 132*e* and 132*f* include a first short sidewall 132*c*, a second short sidewall 132*d*, a first long sidewall 132*e* and a second long sidewall 132*f*.

The first short sidewall 132*c* and the second short sidewall 132*d* are formed to surround both short sides of the terminal plate 133. In one embodiment, widths of the first short sidewall 132*c* and the second short sidewall 132*d* are greater than widths of opposite short sides of the terminal plate 133 to prevent the inner surface of the long side portion 121 of the can 120 from making direct contact with the terminal plate 133 by the first short sidewall 132*c* and the second short sidewall 132*d* due to temporary deformation of the long side portion 121 of the can 120 during the drop weight impact test of the secondary battery 100.

The first long sidewall 132*e* and the second long sidewall 132*f* are formed to surround both long sides of the terminal plate 133.

Recessed regions 132*e*' and 132*f*' having portions removed therefrom are formed in the first and second long side walls 132*e* and 132*f*, respectively. In other words, the long side walls 132*e*, 132*f* of the insulation plate 132 have a reduced height at the recessed regions 132*e*', 132*f*'. In one embodiment, the recessed regions 132*e*' and 132*f*' are formed at regions of the first and second long side walls 132*e* and 132*f* contacting the first and second short side walls 132*c* and 132*d* to allow corners of the terminal plate 133 to make easy contact with the inner surface of the can 120 through the recessed regions 132*e*' and 132*f*' upon deformation of the secondary battery 100 during longitudinal compression.

In other words, in one embodiment, the recessed regions 132*e*' and 132*f*' may be positioned to be close to the center of the can 120 because the secondary battery 100 is typically deformed such that the center of the can 120 is bent during longitudinal compression. Shapes of the sidewalls of the insulation plate 132 will now be described in detail. Since the recessed regions 132*e*' and 132*f*' are formed at regions where the first short sidewall 132*c* positioned to be close to the center of the can 120 makes contact with the first and second long side walls 132*e* and 132*f*, as shown in FIG. 3A, the first short sidewall 132*c* is substantially linear (i.e., a straight line), and the first and second long side walls 132*e* and 132*f* and the second short sidewall 132*d* are connected to each other to have a substantially "U" shape.

In one embodiment, the terminal plate 133 is made of nickel (Ni) or a nickel (Ni) and is installed on a bottom surface of the bottom plate 132*a* of the insulation plate 132 and sized to correspond to an area of the bottom plate 132*a* of the insulation plate 132. In one embodiment, a thickness of the terminal plate 133 may correspond to thicknesses of sidewalls 132*c*, 132*d*, 132*e* and 132*f* of the insulation plate 132 such that an edge of the sidewalls and a surface of the terminal plate are substantially flush with each other. However, it will be appreciated that other thickness variations may also occur.

In addition, the terminal plate 133 has a terminal passing hole 133*a* formed at a portion corresponding to or aligned with the terminal passing hole 132*b* of the insulation plate 132. In such a manner, the negative electrode terminal 134 passes through the cap plate 131, the insulation plate 132 and the terminal plate 132 to be electrically connected to the negative electrode tab 115.

The insulation case 140 is formed between the electrode assembly 120 and the cap assembly 130 in the can 110. The insulation case 140 has a positive electrode tab passing hole 141 and a negative electrode tab passing hole 142 formed therein to allow the positive electrode tab 114 to be connected to the cap plate 131 through the positive electrode tab passing hole 141 and to allow the negative electrode tab 115 to be connected to the terminal plate 133 through the negative electrode tab passing hole 142.

Next, a distortion due to various tests of the secondary battery 100 according to the embodiment of the present invention will be described with reference to FIGS. 4A to 4C.

Figure 4A:
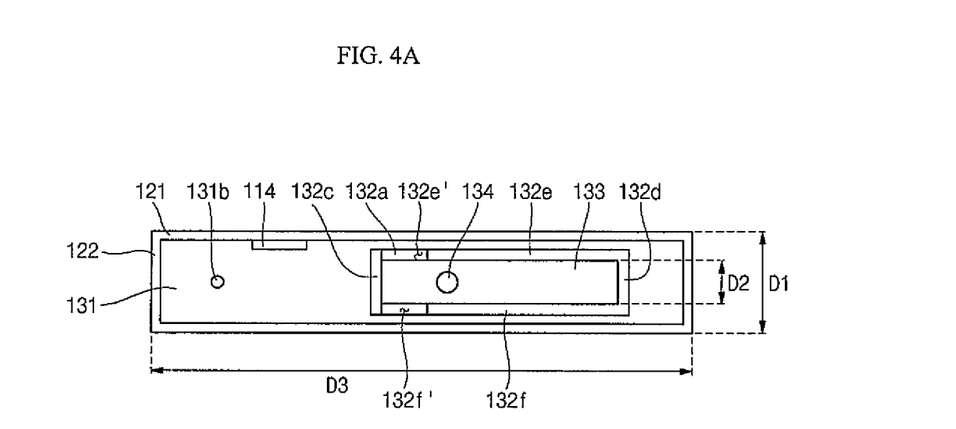
FIG. 4A is a cross-sectional view taken along the line A-A' of FIG. 2.
Figure 4B:
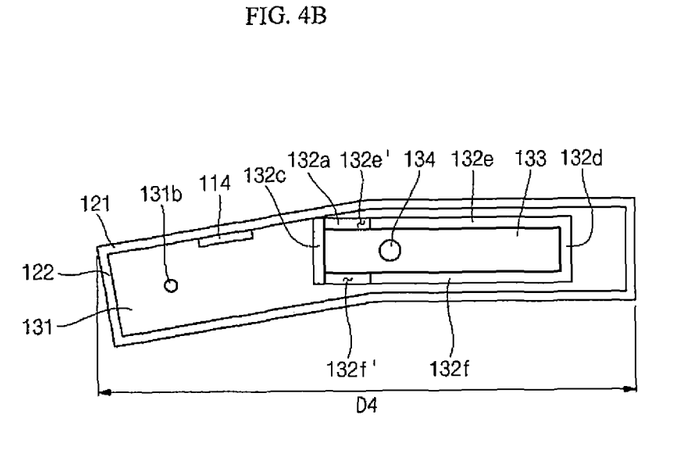
FIG. 4B is a cross-sectional view illustrating a phase of the secondary battery according to an embodiment of the present invention during a drop weight impact test.
Figure 4C:
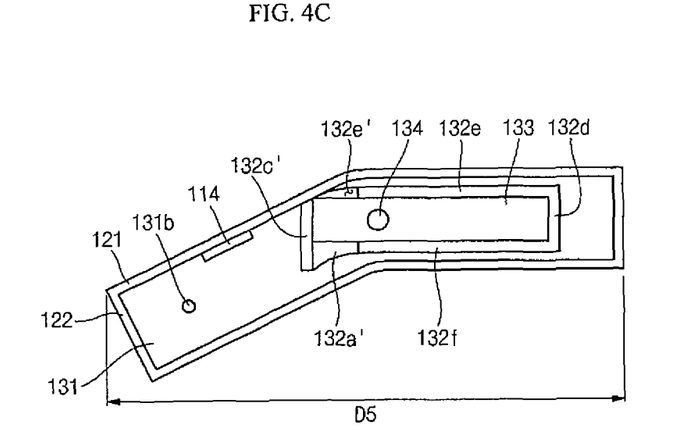
FIG. 4C is a cross-sectional view illustrating a phase of the secondary battery according to an embodiment of the present invention during a longitudinal compression test.

FIG. 4A is a cross-sectional view taken along the line A-A' of FIG. 2, FIG. 4B is a cross-sectional view illustrating a phase or snapshot of the secondary battery according to an embodiment of the present invention during a drop weight impact test, and FIG. 4C is a cross-sectional view illustrating a phase or snapshot of the secondary battery according to an embodiment of the present invention during a longitudinal compression test.

As described above, when a length D1 of the short side portion 122 of the can 120 is less than approximately 7 mm, during a drop weight impact test of the conventional secondary battery, the inner surface of the can and the exposed terminal plate may be readily brought into contact with each other due to temporary deformation of the can. However, as shown in FIGS. 4A and 4B, if the first short sidewall 132c of the insulation plate 132 is made to be larger than a width of one end of the terminal plate 133, one side of the terminal plate 133 can be prevented from making contact with the can 120 due to presence of the first short sidewall 132c.

In other words, as shown in FIG. 4A, assuming that a length D3 of the long side portion 121 of the can 120 is approximately 100%, the long side portion 121 of the can 120 is temporarily deformed due to the impact applied during the drop weight impact test of the secondary battery 100. For example, as shown in FIG. 4B, the secondary battery 100 is deformed such that a length D4 of the long side portion 121 of the can 120 is between approximately 90% and approximately 100% of its original length. However, the long side portion 121 of the can 120 may be blocked by the first short sidewall 132c of the insulation plate 132 even upon deformation of the can 120, thereby preventing the can 120 from making contact with the side of the terminal plate 133 exposed to the recessed region 132e'.

In one embodiment, when longitudinal compression is applied to the secondary battery 100 with a force exceeding the impact applied during the drop weight impact test, the long side portion 121 of the can 120 is usually more severely deformed. In other words, as shown in FIG. 4C, the secondary battery 100 is deformed such that a length D5 of the long side portion 121 of the can 120 is approximately 90% or less. Here, due to the deformation of the can 120, the first short sidewall 132c of the insulation plate 132 is displaced to become a modified first short side wall 132c', and the bottom plate 132a is also displaced to become a modified bottom plate 132a'. In other words, when longitudinal compression is applied to the secondary battery 100, the inner surface of the can 120 may make contact with the one side of the terminal plate 133 exposed to the recessed region 132e' due to modification of the first short sidewall 132c and the bottom plate 132a. In other words, as described above, only when longitudinal compression is applied to the secondary battery 100, the can 120 electrically connected to the positive electrode plate 111 and the terminal plate 133 electrically connected to the negative electrode plate 112 are electrically short circuited, thereby causing current drains.

In one embodiment, a width D2 of the terminal plate 133, i.e., a width of the can 120, is approximately 35% to 55% of a width D1 of the short side portion 122. If the width D2 of the terminal plate 133 is approximately 35% or less of the width D1 of the can 120, it is likely that the terminal plate 133 and the inner surface of the can 120 are not brought into contact with each other by a longitudinally compressive impact up to a preset amount. As will be appreciated, if the width D2 of the terminal plate 133 is approximately 55% or greater than the width D1 of the can 120, the terminal plate 133 and the inner surface of the can 120 may be brought into contact earlier than for the stated range provided only for illustration. However, the present invention is not limited to the range of widths of the terminal plate 133 stated above.

Tables 1 and 2 show results of the drop weight impact test and the longitudinal compression test applied to the conventional secondary battery and the inventive secondary battery 100. The drop weight impact test was carried out such that the secondary battery is dropped 20 times at a height of approximately 1 m so as to allow the respective surfaces of the secondary battery 100 to evenly touch the bottom. The longitudinal compression test was carried out by applying a pressure of 1300 kg to one or both sides of the short side portion of the can 120. However, the present invention is not limited to the test methods illustrated herein.

TABLE 1

|  | Inventive secondary battery 100 | Conventional secondary battery |
|---|---|---|
| Occurrence of electric short | x | o |

TABLE 2

|  | Inventive secondary battery 100 | Conventional secondary battery |
|---|---|---|
| Occurrence of electric short | o | o |

Although the secondary battery according to an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
an electrode assembly comprising a positive electrode plate and a negative electrode plate;
a can having an opening and accommodating the electrode assembly and being electrically connected to the positive electrode plate; and
a cap assembly comprising a cap plate sealing the opening of the can, a terminal plate on one side of the cap plate and being electrically connected to the negative electrode plate, and an insulation plate located between the cap plate and the terminal plate, the insulation plate comprising a bottom plate, and first and second long side walls and first and second short side walls protruding from the bottom plate and respectively encompassing opposing long sides and opposing short sides of the terminal plate,
wherein the first and second short side walls extend entirely across a width of the bottom plate, and wherein a length of the first and second short side walls is greater than a width of the terminal plate,
wherein the first and second long side walls have recessed regions, wherein each of the recessed regions is located between the first short side wall and the first long side wall, and between the first short side wall and the second long side wall so as to expose corners of the terminal plate, and
wherein the terminal plate is configured to contact the can at the recessed regions when the can is deformed by a certain amount of compression.

2. The secondary battery of claim 1, wherein the recessed regions are located adjacent to the first short side wall.

3. The secondary battery of claim 1, wherein a side surface of the can includes a long side portion and a short side portion narrower than the long side portion.

4. The secondary battery of claim 3, wherein a width of the short side portion of the can is from about 3 mm to about 7 mm.

5. The secondary battery of claim 3, wherein when the can is deformed by a predetermined amount due to longitudinal compression, the terminal plate is configured to make contact with the long sides of the can.

6. The secondary battery of claim 1, wherein a height of the first and second long side walls and the first and second short side walls is at least as great as a height of the terminal plate.

7. The secondary battery of claim 1, wherein a width of the short side of the terminal plate is from about 35% to about 55% of a width of the can.

\* \* \* \* \*